US011465097B2

(12) United States Patent
Hartnett

(10) Patent No.: US 11,465,097 B2
(45) Date of Patent: Oct. 11, 2022

(54) MOISTURE REMOVING DEVICE FOR A LAUNDRY APPLIANCE THAT INCORPORATES A NANOPORE MEMBRANE

(71) Applicant: WHIRLPOOL CORPORATION, Benton Harbor, MI (US)

(72) Inventor: Christopher A. Hartnett, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 406 days.

(21) Appl. No.: 16/680,966

(22) Filed: Nov. 12, 2019

(65) Prior Publication Data
US 2020/0206681 A1    Jul. 2, 2020

Related U.S. Application Data

(60) Provisional application No. 62/785,886, filed on Dec. 28, 2018.

(51) Int. Cl.
| | |
|---|---|
| *B01D 53/26* | (2006.01) |
| *B01D 53/22* | (2006.01) |
| *D06F 58/04* | (2006.01) |
| *D06F 58/24* | (2006.01) |

(52) U.S. Cl.
CPC ......... *B01D 53/268* (2013.01); *B01D 53/227* (2013.01); *B01D 53/265* (2013.01); *D06F 58/04* (2013.01); *D06F 58/24* (2013.01); *B01D 2053/223* (2013.01)

(58) Field of Classification Search
None
See application file for complete search history.

(56) References Cited

U.S. PATENT DOCUMENTS

| | | | |
|---|---|---|---|
| 4,583,996 A * | 4/1986 | Sakata | ................. B01D 53/268 95/52 |
| 6,539,731 B2 | 4/2003 | Kesten et al. | |
| 7,197,838 B2 | 4/2007 | Jo | |
| 8,353,115 B2 | 1/2013 | Steffens | |
| 8,500,960 B2 | 8/2013 | Ehrenberg et al. | |
| 9,555,376 B2 | 1/2017 | Matviychuk et al. | |

(Continued)

FOREIGN PATENT DOCUMENTS

| | | |
|---|---|---|
| EP | 0737772 | 10/1996 |
| EP | 1989351 | 11/2008 |

*Primary Examiner* — Jason M Greene
(74) *Attorney, Agent, or Firm* — Price Heneveld LLP

(57) ABSTRACT

A dehumidification mechanism for an appliance includes a blower that delivers humid process air along an airflow path. A drum is positioned along the airflow path. A condensing apparatus dehumidifies the humid air to define dehumidified air. A membrane has a plurality of nanopores that define a portion of the airflow path within the condensing apparatus. The humid air is delivered along the membrane having the plurality of nanopores and the nanopores operate through capillary condensation to dehumidify the humid air and separate condensate away from the humid air to define the dehumidified air. The condensate removed by the nanopore membrane is delivered away from the airflow path and to a condensate collection area within the appliance.

10 Claims, 6 Drawing Sheets

(56) References Cited

U.S. PATENT DOCUMENTS

| | | | |
|---|---|---|---|
| 2002/0139127 A1* | 10/2002 | Kesten | B01D 53/268 62/93 |
| 2004/0045187 A1* | 3/2004 | Curry | D06F 58/263 34/595 |
| 2014/0157985 A1* | 6/2014 | Scovazzo | B01D 53/268 95/52 |
| 2016/0256821 A1 | 9/2016 | Kesten et al. | |
| 2018/0135217 A1 | 5/2018 | Jung et al. | |
| 2020/0171422 A1* | 6/2020 | Bischoff | B01D 53/268 |

* cited by examiner

MOISTURE REMOVING DEVICE FOR A LAUNDRY APPLIANCE THAT INCORPORATES A NANOPORE MEMBRANE

CROSS-REFERENCE TO RELATED APPLICATION

This application claims priority to and the benefit under 35 U.S.C. § 119(e) of U.S. Provisional Patent Application No. 62/785,886, filed on Dec. 28, 2018, entitled MOISTURE REMOVING DEVICE FOR A LAUNDRY APPLIANCE THAT INCORPORATES A NANOPORE MEMBRANE, the entire disclosure of which is hereby incorporated herein by reference.

FIELD OF THE DEVICE

The device is in the field of laundry appliances, and more specifically, a laundry appliance for drying laundry articles using a nanopore membrane for dehydrating process air that is moved through the appliance.

SUMMARY

According to one aspect of the present disclosure, a dehumidification mechanism for an appliance includes a blower that delivers humid process air along an airflow path. A drum is positioned along the airflow path. A condensing apparatus dehumidifies the humid air to define dehumidified air. A membrane has a plurality of nanopores that define a portion of the airflow path within the condensing apparatus. The humid air is delivered along the membrane having the plurality of nanopores and the nanopores operate through capillary condensation to dehumidify the humid air and separate condensate away from the humid air to define the dehumidified air. The condensate removed by the nanopore membrane is delivered away from the airflow path and to a condensate collection area within the appliance.

According to another aspect of the present disclosure, a dehumidification mechanism for an appliance includes a blower that delivers humid process air along an airflow path. A drum is positioned along the airflow path. A condensing apparatus dehumidifies the humid air to define dehumidified air. A membrane has a plurality of nanopores that define a portion of the airflow path within the condensing apparatus. The membrane is contained within at least one tube through which the humid air is directed as it moves through the condensing apparatus. The humid air is delivered along the membrane having the plurality of nanopores and the nanopores operate through capillary condensation to dehumidify the humid air and separate condensate away from the humid air to define the dehumidified air leaving the condensing apparatus. Heat generated by the capillary condensation within the nanopore membrane is transferred to the dehumidified air.

According to yet another aspect of the present disclosure, a dehumidification mechanism for an appliance includes a blower that delivers humid process air along an airflow path. A drum is positioned along the airflow path. A condensing apparatus dehumidifies the humid air to define dehumidified air. A membrane has a plurality of nanopores that define a plurality of dehumidification tubes within the condensing apparatus. The plurality of dehumidification tubes each receive a portion of the humid process air. The humid air is delivered through the plurality of dehumidification tubes having the plurality of nanopores and the nanopores operate through capillary condensation to dehumidify the humid air and separate condensate away from the humid air to define the dehumidified air leaving the plurality of dehumidification tubes and the condensing apparatus. Condensate captured by the plurality of dehumidification tubes is collected in a condensate collection area outside of the condensing apparatus, and heat generated by the capillary condensation within the membrane is transferred to the dehumidified air.

These and other features, advantages, and objects of the present device will be further understood and appreciated by those skilled in the art upon studying the following specification, claims, and appended drawings.

DETAILED DESCRIPTION OF EMBODIMENTS

Figure 1:
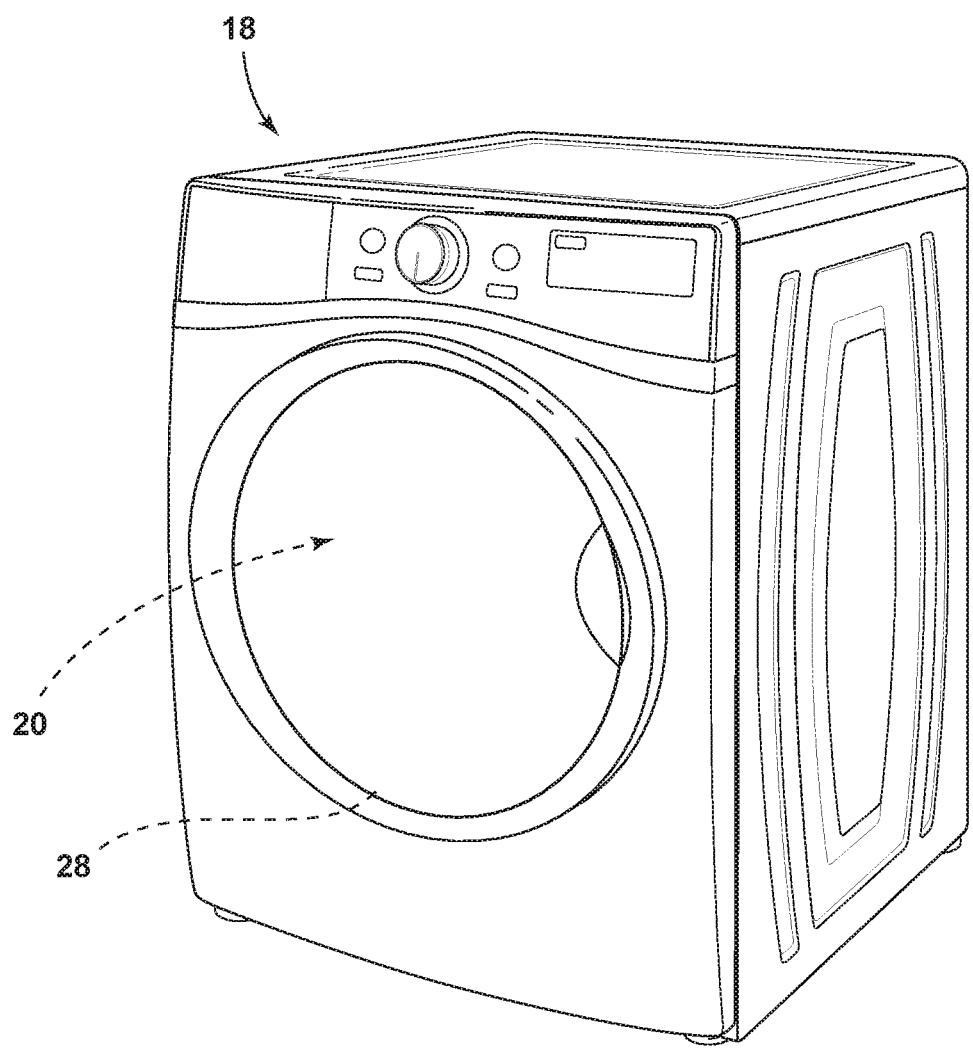
FIG. 1 is a front perspective view of a drying appliance that incorporates an aspect of the nanopore membrane for dehumidifying process air.
Figure 2:
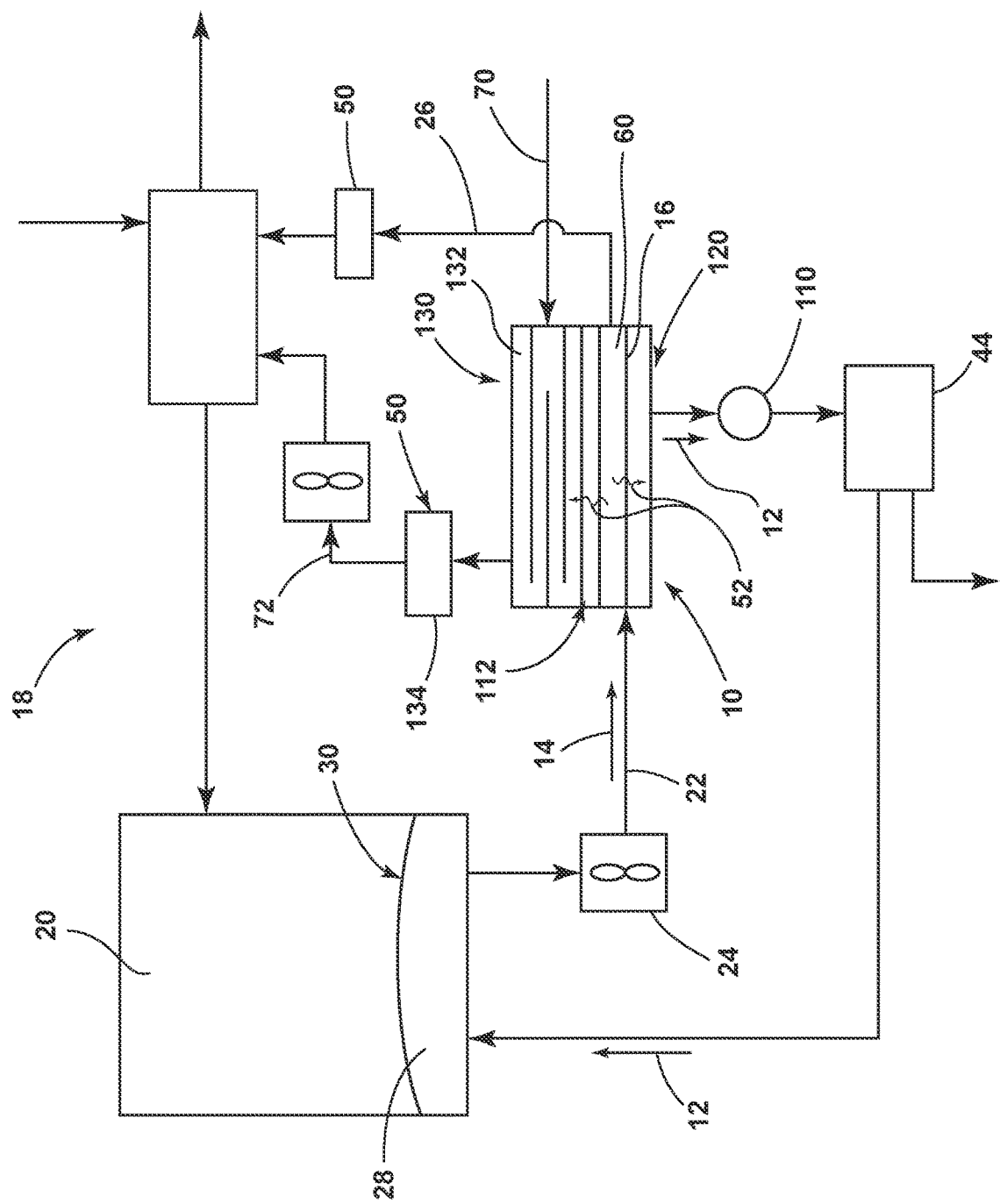
FIG. 2 is a schematic diagram illustrating an air cooled nanopore membrane system.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With respect to FIGS. 1-6, reference numeral 10 generally refers to a condensing apparatus that removes moisture, typically as condensate 12, from humid air 14 using a nanopore membrane 16. According to various aspects of the device, a laundry appliance 18 can include a rotating drum 20, or other processing volume of the appliance 18, that is incorporated within an airflow path 22 of the appliance 18. A blower 24 operates to move process air 26 through the airflow path 22 and through the rotating drum 20 for drying the laundry articles 28 contained therein. During operation of the blower 24, the process air 26 is moved through the airflow path 22 and into the drum 20, where the process air 26 collects moisture 30 from the damp laundry articles 28 contained therein. This process air 26, which after collecting moisture to define humid air 14, leaves the drum 20 and is directed towards the condensing apparatus 10 to remove the moisture 30 in the form of condensate 12.

Referring again to FIGS. 2-5, the dehumidification mechanism, in the form of the condensing apparatus 10 for the appliance 18, includes the airflow path 22 that extends through the condensing apparatus 10. The nanopore membrane 16 positioned within the condensing apparatus 10 is disposed in the general shape of a tube 40 through which the process air 26 travels. As the humid air 14 travels through the tube 40, a plurality of nanopores 42 defined within the nanopore membrane 16 operate to condense moisture 30 from the humid air 14 to form condensate 12, and deliver this condensate 12 through the various nanopores 42 and toward a condensate collection area 44. The nanopores 42 operate to dehumidify the humid air 14 through a process of capillary condensation. The condensate 12 separated from the humid air 14 is transported away via the nanopores 42 and other porous structures and the condensate 12 is delivered away from the airflow path 22 and into a condensate collection area 44.

According to various aspects of the device, the appliance 18 can include a dedicated heater 50, such as an electric heater, condenser 134, other heat exchanger 130, or other similar heater that can be used to heat process air 26 as it enters into the drum 20 for the appliance 18. Heated air has a higher moisture-carrying capacity and typically retains more moisture 30, such that greater amounts of moisture 30 from the damp laundry articles 28 can be absorbed within the process air 26 and moved toward the condensing apparatus 10. Heat 52 for heating the process air 26 can also occur within the nanopore membrane 16. During the process of capillary condensation, heat 52 is generated within the nanopore membrane 16, as latent heat 52 of condensation, due to the phase change of the water from gas or vapor to liquid. As the moisture 30 within the humid air 14 condenses in the nanopores 42, there is a decrease in humidity within the process air 26. This condensation causes an increase in temperature of the nanopore membrane 16. The humid air 14 becomes dehumidified air as the moisture 30 is removed. The process air 26 is also cooled as it is dehumidified. In certain embodiments, the heated nanopore membrane 16 can operate to at least partially heat 52 the process air 26 or heat incoming fresh air. The heat 52 can also be recaptured within a heat sink or other heat storage member for later use within the appliance 18 or other purposes.

Referring again to FIGS. 2-4, the nanopore membrane 16 is shaped in a tube shape or a generally tube-shaped configuration in the form of an air conduit or nanopore conduit 60. During operation of the appliance 18, the process air 26 moves through the nanopore conduit 60 defined within the tube 40 of the nanopore membrane 16. As the humid air 14 moves through the nanopore conduit 60, moisture 30 is extracted from the humid air 14 via the nanopores 42 via capillary condensation to form condensate 12. This condensate 12 is moved radially through the tube 40 of the nanopore membrane 16 and other porous materials 92 that surround the nanopore membrane 16. After the moisture 30 is removed from the humid air 14 to form condensate 12, the condensate 12 is delivered from the condensing apparatus 10 and to the holding tank or condensate collection area 44 for accumulating condensate 12 removed from the humid air 14. This condensate 12 can be eliminated from the appliance 18 through an outlet or drain or can be reused within the appliance 18 through a fluid recirculation system.

Referring again to FIGS. 1-3 and 5, during the process of capillary condensation performed by the nanopore membrane 16, latent heat 52 is accumulated within the nanopore membrane as a result of the extraction, via condensation, of moisture 30 from the humid air 14. The nanopore membrane 16 can become heated during this process of capillary condensation. In order to cool the nanopore membrane 16, or recapture heat 52 from the nanopore membrane 16, as a cooling system, a stream of cool air 70 can be delivered through the condensing apparatus 10. This stream of cool air 70 can serve to cool the nanopore membrane 16. Additionally, as the stream of cool air 70 moves through the heated nanopore membrane 16, heated recapture air 72 is formed that can be reused within the appliance 18. Such reuse can be for continuing the drying process of damp laundry articles 28 within the drum 20. This heated humid air 14 can also be evacuated from the appliance 18.

Figure 3:
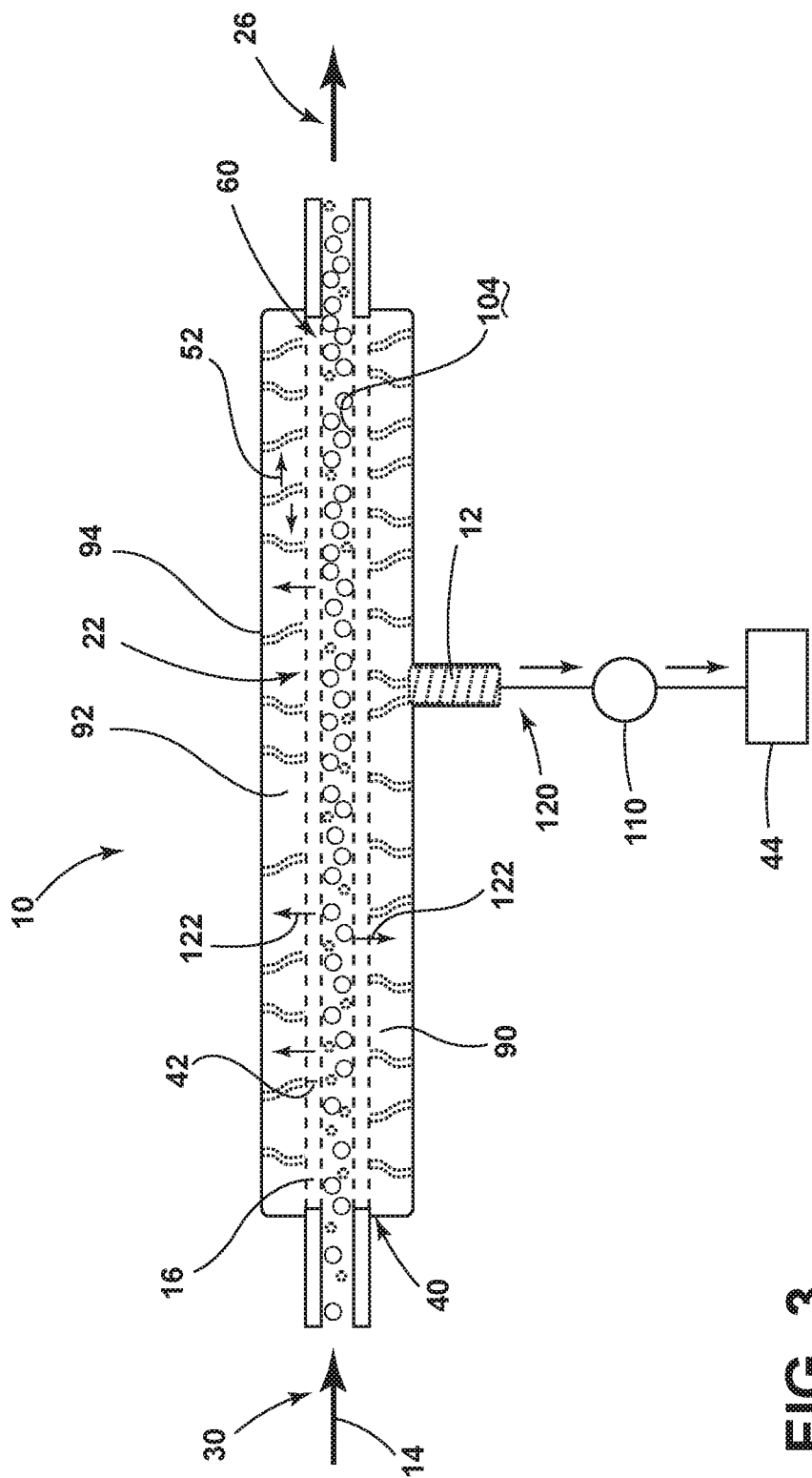
FIG. 3 is a schematic cross-sectional view of a condenser that incorporates an aspect of the nanopore membrane for removing moisture from humid air within the airflow path.
Figure 4:
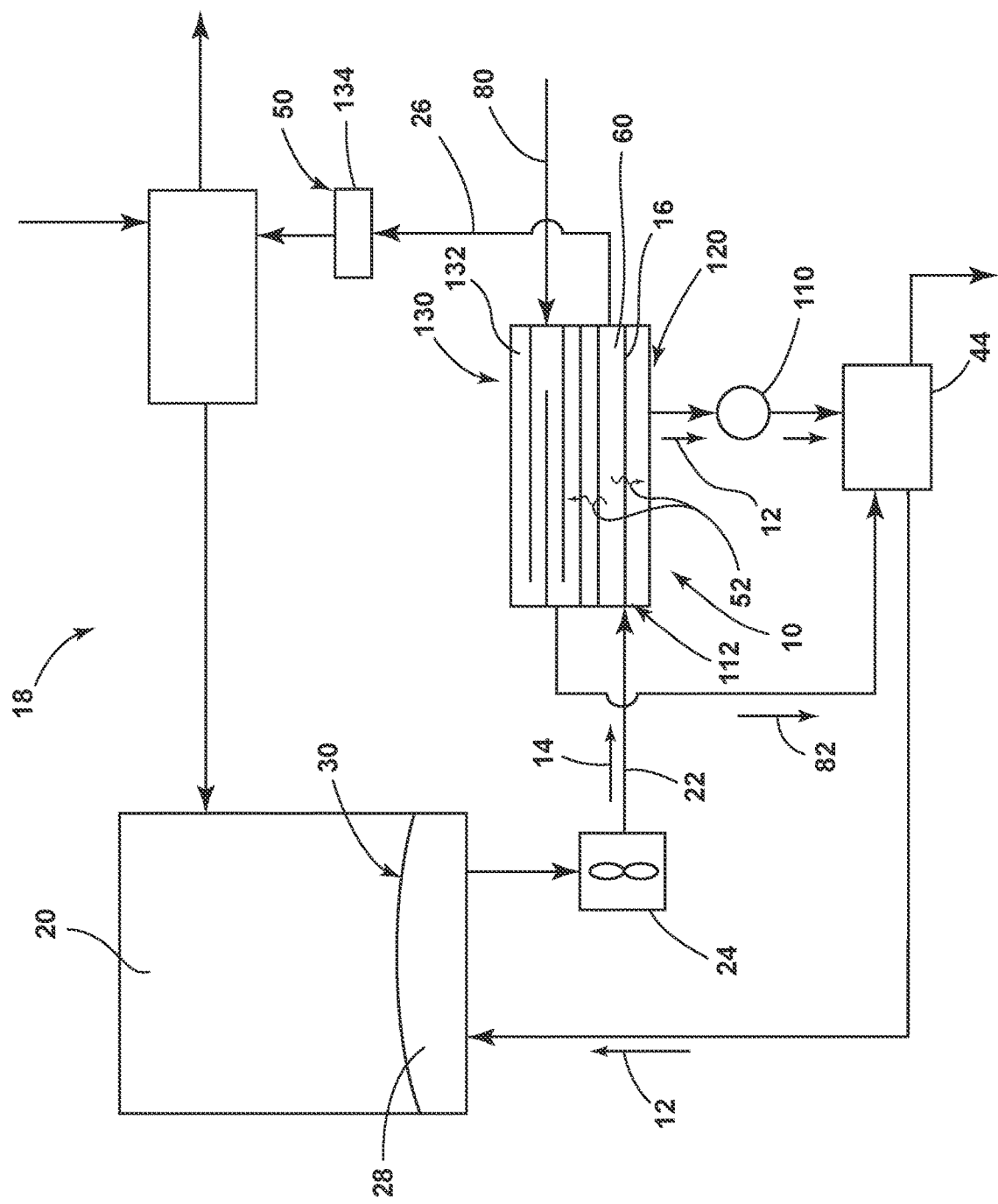
FIG. 4 is a schematic diagram illustrating an aspect of the airflow path that includes a fluid delivery system for cooling the nanopore membrane for the drying appliance.

Referring now to FIGS. 3 and 4, in another aspect of the device, latent heat 52 that is accumulated within the nanopore membrane 16 can be removed using cooling water 80 that can be delivered through a portion of the condensing apparatus 10. Cooling water 80 is in contact with portions of the nanopore membrane 16 to collect latent heat 52 that is built up during capillary condensation that occurs within the nanopore membrane 16. This cooling water 80 accumulates heat 52 and becomes heated water 82 that can be delivered into the collection area 44 along with the remaining condensate 12. This heated water 82 can also be delivered to a separate location within the appliance 18, or a separate location within the structure containing the appliance 18.

Referring again to FIGS. 2-5, the nanopore membrane 16 can vary in thickness 100 and also vary in the configuration of the nanopores 42. To provide structural support to the nanopore membrane 16, various outer layers 90 can be positioned around the nanopore membrane 16 to support functioning of the condensing apparatus 10 and also to provide additional structural support to the nanopore membrane 16. The supporting outer layers 90 for the nanopore membrane 16 can be in the form of a porous material 92 for assisting in the removal of condensate 12, as well as a rigid outer housing or structure 94 that can protect as well as contain the nanopore membrane 16 and the other support layers that surround the nanopore membrane 16.

Referring again to FIGS. 3 and 5, the various nanopores 42 included within the nanopore membrane 16 can have a varying cross-sectional thickness 100. By way of example, and not limitation, each nanopore 42 can have a flared configuration with a narrow inner diameter 102 that is formed at the outer surface 104 of the airflow path 22. The nanopore 42 can also include a flared and larger outer diameter 106 that is located near the condensation layer or porous material 92 that surrounds the nanopore membrane 16. The pore size of the various nanopores 42 for the nanopore membrane 16 can be within a range of from about two nanometers to about 100 nanometers. It should be understood that pore sizes of the nanopores 42 can vary within the material of the nanopore membrane 16. Variation in the pore sizes can also be implemented and utilized depending upon the configuration of the appliance 18 and the configuration of the condensing apparatus 10 used within the appliance 18. Additionally, the positioning and configuration of the various nanopores 42 within the nanopore membrane 16 can be homogenous and relatively consistent, or can be non-homogenous with inconsistent pore spacing. Also the distribution of the sizes of the various nanopores 42 can also vary between even spacing and varied spacing.

As exemplified in FIGS. 2-6, in order to promote the movement of condensate 12 through the nanopore membrane 16 and toward the holding tank for collecting the condensate 12, a pump 110 can be used to apply a vacuum pressure 112, such as a suction or other negative pressure, to areas surrounding the nanopore membrane 16. In this manner, the use of the pump 110 can create a vacuum pressure 112 that supplements the force of capillary action for moving the condensate 12 through the various porous networks, including nanopores 42. The pump 110 is typically located on the condensate side 120 of the nanopore membrane 16 and pulls a vacuum pressure 112 for drawing the condensate 12 from the nanopores 42 of the nanopore membrane 16 and toward the collection area 44. The vacuum pressure 112 is applied around the entire nanopore membrane 16. In this manner, the vacuum pressure 112 supports the radial movement 122 of the condensate 12 through the nanopore membrane 16 and the porous structure 92 in all directions.

During the operation of the appliance 18, the capillary condensation that occurs within the nanopore membrane 16 can generate various amounts of heat 52. A heat exchanger 130 can be positioned proximate, and typically in contact with, the nanopore membrane 16 to cool the nanopore membrane 16. Typically, a heat exchanger 132, such as an evaporator, can be located proximate, and typically in contact with, the nanopore membrane 16 such that when cool air 70, such as outside air, is moved through the heat exchanger 132, the nanopore membrane 16 can be cooled. A condenser 134 can be located downstream of the nanopore membrane 16. In such an embodiment, the condenser 134 can be used to heat the process air 26 before it returns to the drum 20 to continue the drying operation.

Figure 5:
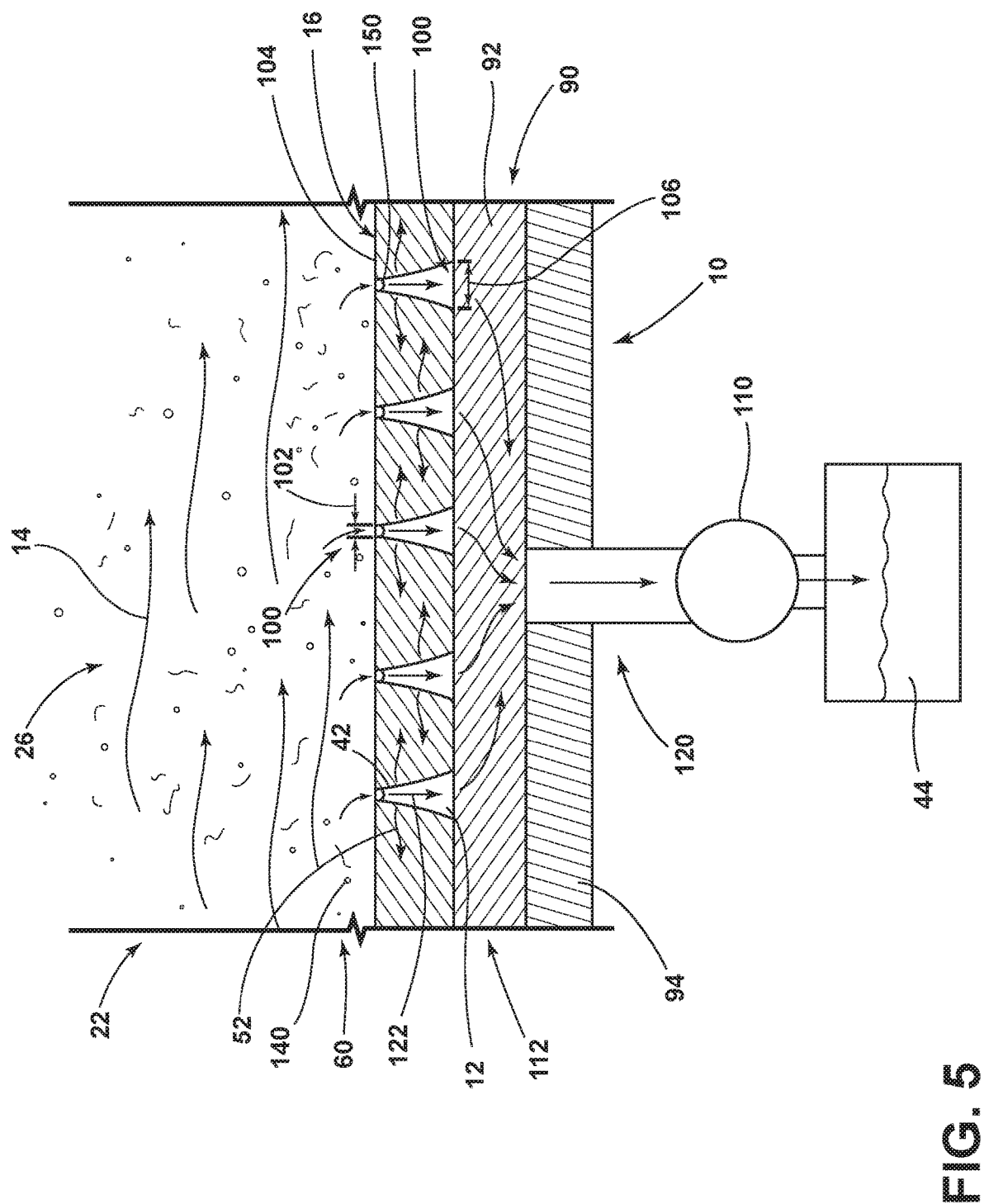
FIG. 5 is an enlarged schematic diagram illustrating the process of capillary condensation through the nanopore membrane.
Figure 6:
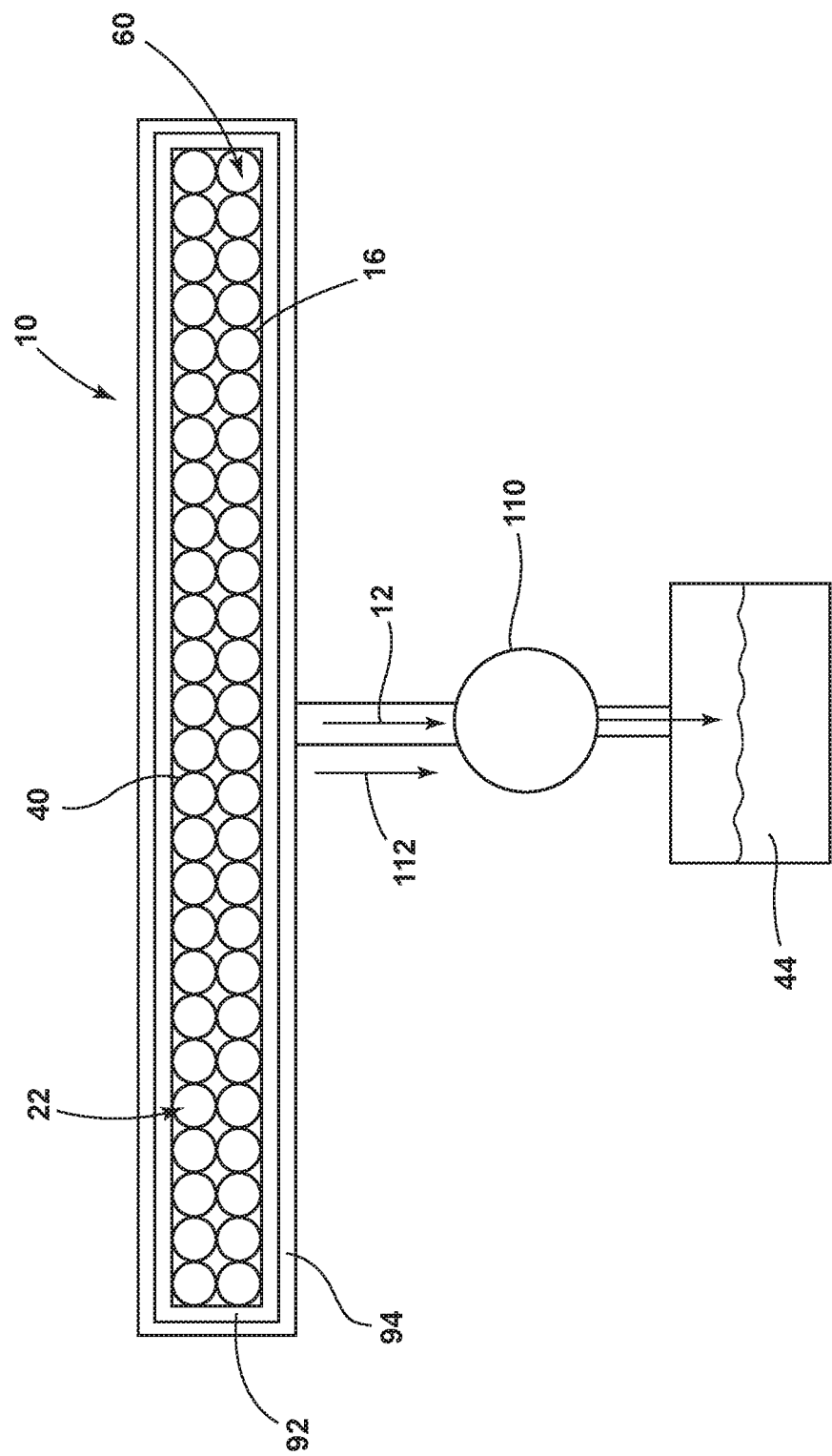
FIG. 6 is a schematic cross-sectional view of an aspect of the condensing apparatus utilizing a plurality of nanopore conduits.

Referring now to FIGS. 5 and 6, the condensing apparatus 10 can include the nanopore membrane 16 in a range of orientations and configurations. In one exemplary aspect, the condensing apparatus 10 can include a plurality of nanopore membranes 16 that are each a tube 40. In this aspect of the device, the airflow path 22 within the condensing apparatus 10 can include a plurality of nanopore conduits 60 or dehumidification tubes 40 that are collected together within the condensing apparatus 10. The multiple nanopore conduits 60 increase the overall surface area of the nanopore membranes 16 that engage the humid air 14. This also increases the number of nanopores 42 that perform the capillary condensation to remove moisture 30 from the humid air 14. Alternatively, a single nanopore membrane 16 can be formed into a single tube 40 or at least one tube 40 that defines the airflow path 22 through the condensing apparatus 10.

Referring again to FIGS. 5 and 6, during operation of the drying appliance 18, as moisture 30 is condensed from the humid air 14 as condensate 12 and is moved through the nanopores 42 through the process of capillary condensation, the humid air 14 may contain particulate material 140 such as lint that is entrapped within the process air 26. Typically, the condensate 12 is removed via the nanopores 42 from an inside surface of the nanopore membrane 16 and forms the airflow path 22, which corresponds to the outer surface 104 of the airflow path 22. In this manner, as the particulate material 140 moves through the airflow path 22, it typically does not directly engage condensate 12 that may be formed within the nanopores 42. A meniscus 150 may form within the nanopores 42 that maintains the condensate 12 in a position distal from the inside surface of the airflow path 22. Accordingly, filtration of the humid air 14 may not need to occur before the humid air 14 reaches the condensing apparatus 10. Various filters can be located along portions of the airflow path 22 for removing and entrapping the particulate material 140 from the process air 26.

When particulate material 140 such as lint particles engage water, the water typically absorbs into the particulate material 140. Because of the configuration of the meniscus 150 formed by the condensate 12, the condensate 12 moves through the nanopores 42 through the process of capillary action. Because the nanopores 42 use capillary condensation to form the condensate 12 having the meniscus 150, the condensate 12 remains substantially distal from the outside surface of the airflow path 22 and at least partially recessed within the nanopores 42. Because of this meniscus 150, the condensate 12 is maintained distal from the inside surface of the airflow path 22 so that the particulate material 140 does not substantially engage the condensate 12 within the nanopore membrane 16.

According to various aspects of the device, the nanopore membrane 16 can be used in any one of various appliances for separating condensate 12 from humid air 14. Such appliances can include, but are not limited to, laundry appliances, dish washers, refrigerators, air conditioners, ovens, countertop appliances, small appliances and other similar appliances and fixtures in household and commercial settings.

According to another aspect of the present disclosure, a dehumidification mechanism for an appliance includes a blower that delivers humid process air along an airflow path. A drum is positioned along the airflow path. A condensing apparatus dehumidifies the humid air to define dehumidified air. A membrane has a plurality of nanopores that define a portion of the airflow path within the condensing apparatus. The humid air is delivered along the membrane having the plurality of nanopores and the nanopores operate through capillary condensation to dehumidify the humid air and separate condensate away from the humid air to define the dehumidified air. The condensate removed by the nanopore membrane is delivered away from the airflow path and to a condensate collection area within the appliance.

According to another aspect, the nanopore membrane is disposed in a tube shape that defines an air conduit, wherein the air conduit forms a portion of the airflow path within the condensing apparatus.

According to yet another aspect, each nanopore within the airflow path can include an inner diameter that ranges from approximately 10 nanometers to approximately 100 nanometers.

According to another aspect of the present disclosure, the condensing apparatus includes a porous material that extends around the nanopore membrane.

According to another aspect, an outer housing extends around the nanopore membrane and the porous material.

According to yet another aspect, a pump operates to suction the condensate from the condensing apparatus to the condensate collection area.

According to another aspect of the present disclosure, the pump generates the suction that partially draws the condensate through the plurality of nanopores.

According to another aspect, the suction generated by the pump draws the condensate through the nanopore membrane substantially equally along a surface of the nanopore membrane that defines the airflow path.

According to yet another aspect, the condensing apparatus includes a plurality of nanopore conduits that include the nanopore membrane.

According to another aspect of the present disclosure, the condensing apparatus includes a cooling system that absorbs latent heat generated within the nanopore membrane during an occurrence of the capillary condensation within the plurality of nanopores.

According to another aspect, a dehumidification mechanism for an appliance includes a blower that delivers humid process air along an airflow path. A drum is positioned along the airflow path. A condensing apparatus dehumidifies the humid air to define dehumidified air. A membrane has a plurality of nanopores that define a portion of the airflow path within the condensing apparatus. The membrane is contained within at least one tube through which the humid air is directed as it moves through the condensing apparatus. The humid air is delivered along the membrane having the plurality of nanopores and the nanopores operate through capillary condensation to dehumidify the humid air and separate condensate away from the humid air to define the dehumidified air leaving the condensing apparatus. Heat generated by the capillary condensation within the nanopore membrane is transferred to the dehumidified air.

According to yet another aspect, the condensate removed by the nanopore membrane is delivered away from the airflow path and to a condensate collection area within the appliance.

According to another aspect of the present disclosure, each nanopore within the airflow path can include an inner diameter that ranges from approximately 10 nanometers to approximately 100 nanometers.

According to another aspect, the condensing apparatus includes a porous material that extends around the nanopore membrane and a rigid outer housing that extends around the nanopore membrane and the porous material.

According to yet another aspect, a pump operates to suction the condensate from the condensing apparatus to the condensate collection area, wherein the pump generates the suction that partially draws the condensate through the plurality of nanopores.

According to another aspect of the present disclosure, the condensing apparatus includes a plurality of tubes that include the nanopore membrane.

According to another aspect, a dehumidification mechanism for an appliance includes a blower that delivers humid process air along an airflow path. A drum is positioned along the airflow path. A condensing apparatus dehumidifies the humid air to define dehumidified air. A membrane has a plurality of nanopores that define a plurality of dehumidification tubes within the condensing apparatus. The plurality of dehumidification tubes each receive a portion of the humid process air. The humid air is delivered through the plurality of dehumidification tubes having the plurality of nanopores and the nanopores operate through capillary condensation to dehumidify the humid air and separate condensate away from the humid air to define the dehumidified air leaving the plurality of dehumidification tubes and the condensing apparatus. Condensate captured by the plurality of dehumidification tubes is collected in a condensate collection area outside of the condensing apparatus, and heat generated by the capillary condensation within the membrane is transferred to the dehumidified air.

According to yet another aspect, each nanopore within the airflow path can include an inner diameter that ranges from approximately 10 nanometers to approximately 100 nanometers.

According to another aspect of the present disclosure, the condensing apparatus includes a porous material that extends around the nanopore membrane and an outer housing that extends around the nanopore membrane and the porous material.

According to another aspect, a pump that operates to suction the condensate from the condensing apparatus to the condensate collection area, wherein the pump generates the suction that partially draws the condensate through the plurality of nanopores.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above are merely for illustrative purposes and not intended to limit the scope of the device, which is defined by the following claims as interpreted according to the principles of patent law, including the Doctrine of Equivalents.

What is claimed is:

1. A dehumidification mechanism for an appliance comprising:
    a blower that delivers humid process air along an airflow path;
    a drum positioned along the airflow path;
    a condensing apparatus that dehumidifies the humid process air to define dehumidified process air;
    a nanopore membrane having a plurality of nanopores and that is disposed in a tube shape that defines the airflow path within the condensing apparatus, wherein the humid process air is delivered along the nanopore membrane and the plurality of nanopores operate through capillary condensation to dehumidify the humid process air and separate condensate away from the humid process air to define the dehumidified process air, and wherein the condensate removed by the nanopore membrane is delivered away from the airflow path and to a condensate collection area within the appliance;
    a porous material that extends around the tube shape of the nanopore membrane;
    an outer housing that extends around the nanopore membrane and the porous material, wherein the porous material is positioned between the nanopore membrane and the outer housing to form a layered structure of the condensing apparatus; and
    a pump that operates to suction the condensate from the outer housing of the condensing apparatus to the condensate collection area, wherein the pump generates the suction substantially equally along a surface of the tube shape of the nanopore membrane, wherein the suction partially draws the condensate through the plurality of nanopores.

2. The dehumidification mechanism of claim 1, wherein each nanopore within the airflow path includes an inner diameter that ranges from approximately 10 nanometers to approximately 100 nanometers.

3. The dehumidification mechanism of claim 1, wherein the condensing apparatus includes a plurality of nanopore conduits that include the nanopore membrane.

4. The dehumidification mechanism of claim 1, wherein the condensing apparatus includes a cooling system that absorbs latent heat generated within the nanopore membrane during an occurrence of the capillary condensation within the plurality of nanopores.

5. A dehumidification mechanism for an appliance comprising:
    a blower that delivers humid process air along an airflow path;
    a drum positioned along the airflow path;
    a condensing apparatus that dehumidifies the humid process air to define dehumidified process air;
    a nanopore membrane having a plurality of nanopores that define a portion of the airflow path within the condensing apparatus, wherein the nanopore membrane is contained within at least one tube through which the humid process air is directed as it moves through the condensing apparatus, wherein the humid process air is delivered along the nanopore membrane, wherein the nanopores operate through capillary condensation to dehumidify the humid process air and separate condensate away from the humid process air to define the dehumidified process air leaving the condensing apparatus, and wherein heat generated by the capillary condensation within the nanopore membrane is transferred to the dehumidified process air;
    a porous material that extends around the nanopore membrane;
    a rigid outer housing that extends around the nanopore membrane and the porous material, wherein the porous material is contained between the nanopore membrane and the rigid outer housing; and
    a pump attached to the rigid outer housing and that operates to suction the condensate from the condensing apparatus to a condensate collection area, wherein the pump generates the suction that partially draws the condensate through the plurality of nanopores.

6. The dehumidification mechanism of claim 5, wherein the condensate removed by the nanopore membrane is delivered away from the airflow path and to a condensate collection area within the appliance.

7. The dehumidification mechanism of claim 6, wherein each nanopore within the airflow path includes an inner diameter that ranges from approximately 10 nanometers to approximately 100 nanometers.

8. The dehumidification mechanism of claim 5, wherein the condensing apparatus includes a plurality of tubes that include the nanopore membrane.

9. A dehumidification mechanism for an appliance comprising:
    a blower that delivers humid process air along an airflow path;
    a drum positioned along the airflow path;
    a condensing apparatus that dehumidifies the humid process air to define dehumidified process air;
    a nanopore membrane having a plurality of nanopores that define a plurality of dehumidification tubes within the condensing apparatus, wherein the plurality of dehumidification tubes each receive a portion of the humid process air, wherein the humid process air is delivered through the plurality of dehumidification tubes having the plurality of nanopores and the nanopores operate through capillary condensation to dehumidify the humid process air and separate condensate away from the humid process air to define the dehumidified process air leaving the plurality of dehumidification tubes and the condensing apparatus, and wherein condensate captured by the plurality of dehumidification tubes is collected in a condensate collection area outside of the condensing apparatus, and heat generated by the capillary condensation within the nanopore membrane is transferred to the dehumidified process air;
    a porous material that extends around the nanopore membrane;
    an outer housing that extends around the nanopore membrane and the porous material, wherein the porous material is contained between the nanopore membrane and the outer housing.

10. The dehumidification mechanism of claim 9, wherein each nanopore within the airflow path includes an inner diameter that ranges from approximately 10 nanometers to approximately 100 nanometers.

* * * * *